(12) United States Patent
Takahashi et al.

(10) Patent No.: US 6,802,073 B1
(45) Date of Patent: Oct. 5, 2004

(54) MAGNETO-OPTICAL RECORDING MEDIUM

(75) Inventors: Koyata Takahashi, Kanagawa (JP); Toshio Inase, Kanagawa (JP); Keiichiro Nishizawa, Kanagawa (JP)

(73) Assignee: Tosoh Corporation, Yamaguchi (JP)

( * ) Notice: Subject to any disclaimer, the term of this patent is extended or adjusted under 35 U.S.C. 154(b) by 488 days.

(21) Appl. No.: 09/762,440

(22) PCT Filed: Jun. 12, 2000

(86) PCT No.: PCT/JP00/03805

§ 371 (c)(1),
(2), (4) Date: Apr. 29, 2003

(30) Foreign Application Priority Data

Jun. 11, 1999 (JP) .............................. 11-165979
Mar. 8, 2000 (JP) ......................... 2000-68639
Mar. 8, 2000 (JP) ......................... 2000-68640

(51) Int. Cl.[7] ............................................. G11B 11/105
(52) U.S. Cl. ................ 720/718; 369/13.53; 369/13.38; 369/13.4; 369/13.46; 369/13.51
(58) Field of Search ..................... 428/694 R, 694 PR, 428/694 GR, 694 TS, 694 DE, 694 ML, 64.3; 369/13.51, 13.35, 13.38, 13.4, 13.53, 13.46; 720/718, 719

(56) References Cited

U.S. PATENT DOCUMENTS

| | | | | |
|---|---|---|---|---|
| 5,577,021 A | * | 11/1996 | Nakatani et al. | 369/275.2 |
| 5,712,833 A | * | 1/1998 | Ogihara et al. | 369/13.35 |
| 5,930,207 A | * | 7/1999 | Abiko | 369/13.4 |

FOREIGN PATENT DOCUMENTS

| | | | | | |
|---|---|---|---|---|---|
| JP | 03160644 A | * | 7/1991 | ........... | G11B/11/10 |
| JP | 03183044 A | * | 8/1991 | ........... | G11B/11/10 |
| JP | 04042452 A | * | 2/1992 | ........... | G11B/11/10 |
| JP | 05258363 A | * | 10/1993 | ........... | G11B/11/10 |
| JP | 06012715 A | * | 1/1994 | ........... | G11B/11/10 |
| JP | 07235090 A | * | 9/1994 | ........... | G11B/11/10 |
| JP | 06302026 A | * | 10/1994 | ........... | G11B/11/10 |
| JP | 09297943 A | * | 11/1997 | ........... | G11B/11/10 |
| JP | 10162442 A | * | 6/1998 | ........... | G11B/11/10 |
| JP | 11007657 A | | 1/1999 | | |
| JP | 11134711 A | | 5/1999 | | |
| JP | 11154360 A | * | 6/1999 | ........... | G11B/11/10 |
| JP | 2000149326 A | | 5/2000 | | |

OTHER PUBLICATIONS

Terris et al., "Near-field Optical Data Storage", Appl. Phys. Lett. 68 (2), Jan. 8, 1996, pp. 141-143.

* cited by examiner

Primary Examiner—William Klimowicz
(74) Attorney, Agent, or Firm—Sughrue Mion, PLLC

(57) ABSTRACT

Disclosed are magneto-optical recording media including at least a reflection layer, a recording layer and a dielectric layer laminated on a substrate in this order, wherein the thickness of the dielectric layer is not less than 140 nm or wherein the dielectric layer is provided by the lamination of upper dielectric layer and lower dielectric layer in which the thermal conductivity of the upper dielectric layer is higher than that of the lower dielectric layer. By arranging the thickness of the dielectric layer in a specific range, the surface roughness of a media in not more than 1.5 nm, and providing a reflection layer composed of a noble metal alloy, achieved is a magneto-optical recording medium able to record constantly in near-field magneto-optical recording, suitable for narrow track pitch, and having excellent SNR, resolution, and recording sensitivity.

10 Claims, 5 Drawing Sheets

MAGNETO-OPTICAL RECORDING MEDIUM

FIELD OF THE INVENTION

The present invention relates to a rewritable optical recording medium, particularly, a magneto-optical recording medium in which the direction of magnetization can be changed by the irradiation of a laser beam in the magnetic field, resulting in recording, reproducing and erasing of information. More particularly, the present invention relates to a surface reading type magneto-optical recording medium which is recorded and reproduced by the irradiation of a laser beam on the surface of the medium.

BACKGROUND OF THE INVENTION

A magneto-optical recording medium is a portable recording medium having a large capacity and high-density. In these years, demand for a magneto-optical recording medium as a rewritable medium has arisen on the purpose for recording files with a large capacity used for computers or data of moving pictures, with the development of the recent multi-media system.

A magneto-optical recording medium is generally composed of a multi-layer including a recording layer formed on a substrate (a transparent circular disk) made of such as plastics. A magneto-optical recording medium is recorded and erased by an irradiation of a laser beam in a magnetic field and reproduced by a reflection light of a laser. As for recording method, formerly, the so-called light intensity modulation recording method is widely conducted, in which conducted erasing a record in a fixed magnetic field followed by recording in a magnetic field fixed in an opposite direction. Lately, a magnetic field modulation recording method is attracting public attention, in which method a magnetic field is modulated in accordance with a recording pattern while irradiation of a laser beam. Because, the above magnetic field modulation recording method is a method capable to record (direct overwriting) with high accuracy and high density in one revolution.

Further, in recent years, a recording and reproducing laser beam was irradiated on a recording layer through a substrate. Currently, as a means of a recording with high density, the so-called near-field optical recording method is attracting public attention, in which method recording and reproducing are operated by an optical head placed adjacent to a recording film (Appl. Phys. Lett. 68,p.141 (1996)). In the above recording method, Solid Immersion Lens (hereinafter referred to as SIL) head is used in order to minimize a focused laser beam spot size. Therefore it is possible to reproduce a mark shorter than that of the former recording limit ($\sim\lambda/2NA$, wherein NA indicates the numerical aperture of the objective lens) determined by the wavelength ($\lambda$) of a laser beam of a light source, resulting in the achievement of recording and reproducing with super high recording density. In near-field optical recording, it is necessary that an optical head is placed adjacent (20 to 200 nm) to an optical medium. Therefore, a laser beam is irradiated on a recording layer directly not through a substrate, not like as a current magneto-optical recording medium with which a laser beam is irradiated on a recording layer through a substrate. That is, a current magneto-optical recording medium generally has a structure of substrate/primary dielectric layer/recording layer/secondary dielectric layer/reflection layer in this order. On the other hand, a magneto-optical recording medium used for near-field optical recording has a structure of substrate/reflection layer/primary dielectric layer/recording layer/secondary dielectric layer in an opposite order to that of the current one. Using a near-field magneto-optical recording medium, a laser beam is irradiated on the top surface of a multi-layer for recording and reproducing (surface reading type recording). In this case, a flying type slider head is often used in order to close a recording layer to a SIL head. As for recording method, it is said that a magnetic field modulation recording is suitable for a near-field magneto-optical recording. In the above magnetic field modulation recording, a recording layer is heated at a temperature higher than Curie temperature of the material by the irradiation of a laser beam and a magnetic field is modulated by a thin film coil formed on a slider head.

In a near-field magneto-optical recording, observed are unfavorable phenomena such as a disordered tracking error signal and adhesion of dust particles while irradiating a recording laser beam, because of the narrow space between a SIL head and the surface of a medium.

The object of the present invention is to provide a near-field magneto-optical recording medium having excellent SNR, resolution, and high recording sensitivity, and which excellent in recording with a short track pitch. Particularly, the object of the present invention is to provide a near-field magneto-optical recording medium capable of stable and reliable recording by the irradiation of a laser beam.

Under these circumstances, the present inventors regarded as follows. The heat in a recording layer generated by a laser power in recording is diffused through a dielectric layer up to the surface of a medium. Then adsorbates and minute dust particles adhere to the surface of a medium are heated and scattered causing the occurrence of disordered optical signals. Also, in the area just under SIL lens, the density of power is extraordinary high. Therefore, if dust particles and defects placed on the surface of a medium or on the optical path under SIL lens, absorbed a laser beam, they were heated unusually causing disordered optical signals.

From above, inventors have made extensive and intensive studies about the structure of a medium, and as a result, found that the object can be solved by inhibiting an increase in temperature of the surface of a medium when a recording layer is heated by irradiation of a laser beam and decreasing the temperature of the surface immediately after irradiation.

That is, the above object can be solved by insulating heat of a recording layer generated by a laser power in recording by use of a thick dielectric layer from the surface of a medium. Namely, the above thermal insulation can be achieved by forming a thick dielectric layer having appropriate characteristics of insulation and thermal diffusion. Also, the object can be solved by forming a two-layered dielectric layer. In the above two-layered dielectric layer, lower dielectric layer next to a recording layer shows thermal insulation effect inhibiting thermal diffusion from a recording layer to the surface of a medium, and upper dielectric layer thereon shows thermal diffusion effect which promote cooling the surface of a medium, adsorbates and minute dust particles adhered to the surface of a medium. From the above, the present invention has been completed.

DISCLOSURE OF THE INVENTION

The first magneto-optical recording medium of the present invention is a magneto-optical recording medium characterized in a plurality of layers comprising at least a reflection layer, a recording layer and a dielectric layer laminated on a substrate in the above order, wherein the thickness of the dielectric layer is not less than 140 nm and not more than 1,000 nm.

The second magneto-optical recording medium of the present invention is a magneto-optical recording medium characterized in a plurality of layers comprising at least a reflection layer, a recording layer, a lower dielectric layer, an upper dielectric layer, and a solid lubricating layer laminated on a substrate in the above order, wherein the thermal conductivity of the upper dielectric layer is higher than that of the lower dielectric layer, and the total thickness of the lower dielectric layer, the upper dielectric layer and the solid lubricating layer is not less than 90 nm and not more than 2,000 nm.

A magneto-optical recording medium of the present invention can be applied in a surface reading type magneto-optical recording medium used in a near-field magneto-optical recording in which it is necessary that an optical head is placed adjacent to a recording medium. The above surface reading type magneto-optical recording medium is used for recording and reproducing by irradiation of a light from the surface of a medium.

BEST MODE FOR CARRYING OUT THE INVENTION

Hereinbelow, the present invention will be described in more detail with reference to the attached drawings.

Figure 1:
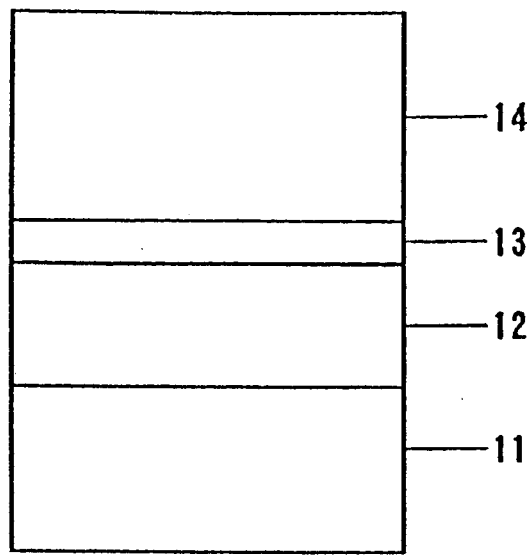
FIG. 1 shows one embodiment of a partial cross-sectional view of the first magneto-optical recording medium of the present invention.

FIG. 1 shows one embodiment of a partial cross-sectional view of the first magneto-optical recording medium of the present invention. On substrate 11, reflection layer 12, recording layer 13 and dielectric layer 14 are laminated.

In recording a signal with a mark length of 0.4 $\mu$m at a linear velocity of 10 m/s using a laser beam having a beam spot size of around 0.4 $\mu$m, the temperature in the middle of a recording layer having a Curie temperature of 220° C. becomes approximately 350° C. calculated by computer simulation. With dielectric layer 14 composed of silicon nitride having a refractive index of 2 and a laser having a wavelength of 680 nm, the maximum SNR (approximately 25 dB) is obtained in the range of 60 to 80 nm of the thickness of dielectric layer 14, by changing the thickness thereof. In the above measurement, the temperature on the surface of the dielectric layer becomes approximately 300° C. instantly. Therefore, in recording on a media having the thickness of a dielectric layer of from 60 to 80 nm, it is occasionally impossible to record through one round of a disk (medium) owing to a disordered tracking error signal. Though, it is possible to record consecutively on a media having the thickness of a dielectric layer of not less than 140 nm. In the above measurement, using a media having the thickness of a dielectric layer of not less than 140 nm, the temperature on the surface of the dielectric layer becomes not more than 200° C. at its maximum. In order to further reducing the maximum temperature on the surface of the dielectric layer to not more than 150° C. it is preferred that the thickness of a dielectric layer is not less than 200 nm. It is also preferred that the thickness of a dielectric layer is not more than 1,000 nm with respect to such as stress of a layer at the least upper bound.

It is preferred that dielectric layer 14 has insulation effect able to maintain the difference between the temperatures of the surface of dielectric layer 14 and the maximum temperature of a recording layer within not less than 100° C. when the temperature of a recording layer is at its maximum by irradiation of a laser beam. Besides, it is necessary that dielectric layer 14 has diffusion effect able to reduce the temperature of the surface immediately after a laser beam interrupted or passed.

That is, it is preferred that the thermal insulating ratio of a dielectric layer ($d_3/\rho$) and a thermal diffusion ratio of a dielectric layer ($\rho d_3$) satisfy a relationship represented by $$d_3/\rho \geq 3 \times 10^{-11} \text{ cm}^2\text{Ks/erg, and}$$

$$\rho d_3 \geq 1.5 \text{ erg/Ks,}$$

wherein, $\rho$ represents the thermal conductivity of a dielectric layer and $d_3$ represents the thickness of a dielectric layer.

The thicker a dielectric layer, the more excellent each of insulation effect and diffusion effect. As for the thermal conductivity, insulation effect and diffusion effect conflict each other, therefore the thickness of the dielectric layer is preferably not less than 140 nm. In case of dielectric layer 14 composed of primary dielectric layer and diamond-like carbon (DLC) layer or silicon dioxide layer as described below, $\rho$ represents the value calculated by multiplying each thermal conductivity of primary dielectric layer and DLC or silicon dioxide layer respectively by each average weight based on the assumption that the layer thickness ratio is equal to the weight ratio, and then adding each of multiplied them.

With respect to the thermal diffusion ratio ($\rho d_3$), it is preferred that $\rho d_3$ is not more than 200 erg/Ks, because a laser power increases in the higher range of $\rho d_3$, resulting in difficulty in recording. With respect to the thermal insulating ratio ($d_3/\rho$), the higher, the better. There is no limitation of $d_3/\rho$, and observed is the effect of the present invention at least in the range of not less than $3 \times 10^{-11}$ cm$^2$Ks/erg and not more than $2 \times 10^{-9}$ cm$^2$Ks/erg of a dielectric layer.

Further, the thicker of a dielectric layer, the rougher of the surface of a dielectric layer. In order to obtain an excellent SNR, the surface roughness (Ra) (the centerline average roughness of a surface) of a dielectric layer is preferably not more than 1.5 nm. The above surface roughness (Ra) is obtained by measuring the center area of the land between adjacent recording tracks in the direction parallel to the track on a dielectric layer (the surface of a medium). As for a measuring method, AFM (Atomic force microscope) can be used for example. The smaller, the surface roughness (Ra) of a dielectric layer is, noise of a read signal becomes preferably fewer. However, it is preferred that Ra is not less than 0.3. Because, when a head touches a medium including a dielectric layer having not more than 0.3 of Ra, friction between the head and the medium becomes so large that it is hard for the head to fly again.

Dielectric layer 14 is preferably transparent optically in the wavelength of the used laser. As for a material of a dielectric layer, one selected from the group of silicon nitride, germanium nitride, tantalum pentaoxide, aluminum nitride and $ZnS$—$SiO_2$ can be used.

With respect to SNR in case that the thickness of a dielectric layer is not less than 140 nm, it is preferred that the refractive index of the dielectric layer ($n_3$), the thickness of the dielectric layer ($d_3$) and the wavelength of reproducing laser ($\lambda$) satisfy a relationship represented by $0.6 \leq (d_3 \cdot n_3)/\lambda \leq 0.9$, or $1.2 \leq (d_3 \cdot n_3)/\lambda \leq 1.5$.

In the above range, excellent SNR can be obtained.

In order to keep a head to fly constantly above a medium, it is preferred that a dielectric layer of the medium is divided into two layers including primary dielectric layer and a solid lubricating layer. The above dielectric layer is preferably composed of primary dielectric layer (refractive index; $n_{31}$, thickness; $d_{31}$) having a refractive index of not less than 1.7 and a solid lubricating layer (refractive index; $n_{32}$, thickness; $d_{32}$) comprising diamond-like carbon (DLC) or silicon dioxide. It is further preferable that the refractive indexes and the thickness of these layers preferably satisfy a relationship represented by $1 \text{ nm} \leq d_{32} \leq 50 \text{ nm}$, and $0.6 \leq (d_{31} \cdot n_{31} + d_{32} \cdot n_{32})/\lambda \leq 0.9$ or $1.2 \leq (d_{31} \cdot n_{31} + d_{32} \cdot n_{32})/\lambda \leq 1.5$, wherein $\lambda$ represents a wavelength of reproducing laser. The refractive index of the primary dielectric layer is preferably high as long as the primary dielectric layer is transparent. However, the lower the refractive index, the thicker the layer and the more excellent in the thermal insulation characteristic.

The primary dielectric layer is preferably transparent optically in the wavelength of the used laser and the refractive index thereof is preferably not less than 1.7. As for a material of primary dielectric layer, one selected from the group of silicon nitride, germanium nitride, tantalum pentaoxide, aluminum nitride and $ZnS$—$SiO_2$ can be used. Among them, silicon nitride, germanium nitride, silicon nitride containing hydrogen in an amount of not more than 30 atom %, and germanium nitride containing hydrogen in an amount of not more than 30 atom % are preferred. Because they are stable and transparent, further, excellent in the thermal insulation. The refractive index of a primary dielectric layer is preferably not less than 1.7, more preferably not less than 1.7 and not more than 3.0, because at a low refractive index, reflectivity arises and noise is enhanced unfavorably.

Reflection layer 12 is composed of a metal excellent in reflectivity and thermal conductivity which metal is selected from the group of Al, Ag, Au, Cu, and an alloy containing at least one metal thereof. Preferably, a reflection layer is a metal film mainly composed of a noble metal such as Ag and Au or Cu. Because, a metal film mainly composed of a noble metal or Cu has less surface roughness compared with that of Al or an alloy of Al, therefore it is able to reduce erase noise. The above metal film mainly composed of a noble metal or Cu means a metal film composed of a noble metal or Cu, in an amount of not less than 90 atom %. Reflection layer 12 should have a thickness (at least approximately 15 nm) with which a read signal is not impaired by the high temperature formed in reading. On the other hand, reflection layer 12 should not have a thickness with which a recording power exceeds the upper limitation owing to excessive cooling of a recording layer.

If a dielectric layer has the excessive thickness, the thermal capacity of a dielectric layer becomes large. Therefore, a large part of absorbed heat in a recording layer by laser irradiation diffuses into a dielectric layer. Then a recording power becomes large, resulting in a large consumption power, then generation of heat from a drive is to be reckoned with. On the other hand, if a recording layer is cooled excessively, the distribution of the temperature becomes gentle in a medium resulting in occasional increase of crosstalk.

In order to prevent excessive cooling of a dielectric layer having a large thickness, it is preferred that the thickness of a reflection layer is small. However, with the thickness of not more than 15 nm of a reflection layer, fevorable signals cannot be obtained due to passing of light through a reflection layer. Therefore, it is preferable that the thermal conductivity is controlled as follows by composing a reflection layer of an alloy.

Namely, it is preferred that reflection layer 12 is composed of a metal film having a thermal conductivity of not less than $4 \times 10^6$ erg/(K.cm.s) and not more than $2 \times 10^7$ erg/(K.cm.s). If the thermal conductivity is too small, sufficient reproducing output cannot be obtained because the temperature of a recording layer increases excessively by a low reproduction power. On the other hand, if the thermal conductivity and the thickness of a reflection layer are too large, recording sensitivity is reduced. The thickness of reflection layer 12 is preferably not less than 15 nm and not more than 60 nm.

The thermal conductivity of reflection layer 12 is reduced by addition of impurities into a noble metal, Cu or Al. However, too much reduction of the thermal conductivity of a reflection layer causes reduction of the reflectivity extremely. Preventing the reduction of the reflectivity, it is preferred that a reflection layer is provided by the lamination of primary reflection layer and secondary reflection layer in this order, wherein the thermal conductivity of the secondary reflection layer is higher than that of the primary reflection layer. It is also preferred that the thickness of the primary reflection layer is from 10 to 60 nm, and the thickness of the secondary reflection layer is from 5 to 30 nm.

In order to obtain favorable carrier to noise ratio (CNR) in high recording density in the wide range of recording power, it is more preferred that a reflection layer is composed of three layers provided by the lamination of a thermal diffusion layer, a thermal insulating layer, and a reflection layer in the above order. The above structure of a reflection layer suppresses thermal diffusion in the direction parallel to the layer in recording, resulting in small variation of a recording mark size and reduction of recording noise. It is preferred that the thickness of a thermal diffusion layer is from 10 to 60 nm, and the thickness of a reflection layer is from 5 to 40 nm.

It is also preferred that a thermal diffusion layer is composed of a metal film having a thermal conductivity of not less than $4 \times 10^6$ erg/(K.cm.s) and not more than $2 \times 10^7$ erg/(K.cm.s) in order to obtain favorable recording sensitivity and sufficient reproducing output.

It is preferred that a reflection layer and/or a thermal diffusion layer is composed of an alloy obtained by adding at least one element selected from the group of Ti, Zr, Hf, V, Nb, Ta, Cr, Mo, and W in an amount of from 0.1 to 10 atom % to Au. With the above alloy, the surface of the layer is smooth due to a sufficiently hard Au alloy, a slider constantly flies above a medium and a favorable SNR is obtained.

It is also preferred that a reflection layer and/or a thermal diffusion layer is composed of an alloy of Au and Cu. With an alloy of Au and Cu, a slider constantly flies above a medium and excellent adhesion and SNR are obtained. It is more preferred that the above alloy contains Cu in an amount of not less than 0.1 atom % and not more than 95 atom %.

It is also preferred that a reflection layer and/or a thermal diffusion layer is composed of an alloy obtained by adding at least one element selected from the group of Au, Pt and Pd in an amount of from 0.1 to 10 atom % and at least one element selected from the group of Cu, Ti, Zr, Hf, V, Nb, Ta, Cr, Mo and W in an amount of from 0.1 to 10 atom % to Ag. With the above alloy, not only a slider constantly flies above a medium and excellent adhesion and SNR are obtained, but also it is available for a laser having short range wavelength such as 400 nm.

It is more preferred that a thin film having a thickness of from 1 to 30 nm and composed of at least one element selected from the group of Ti, Zr, Hf, V, Nb, Ta, Cr, Mo and W is provided as a lower layer between a substrate and a reflection layer or between a substrate and a thermal diffusion. With the lower layer, crystal size of a reflection layer or a thermal diffusion layer becomes small and a reflection layer or a thermal diffusion layer shows excellent adhesion to a substrate.

Figure 2:
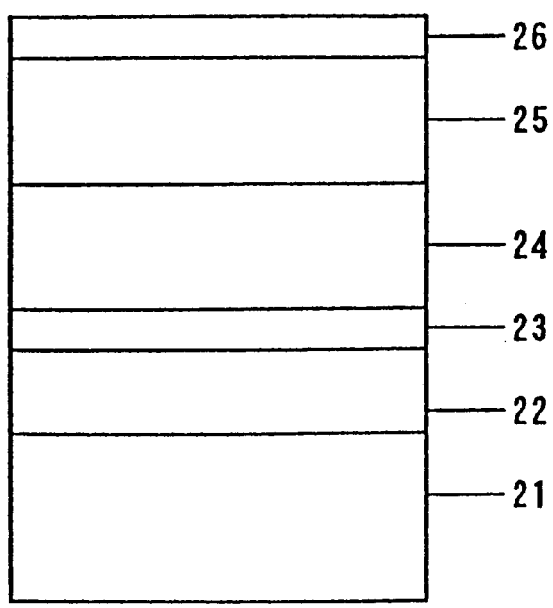
FIG. 2 shows one embodiment of a partial cross-sectional view of the second magneto-optical recording medium of the present invention.

FIG. 2 shows one embodiment of a partial cross-sectional view of the second magneto-optical recording medium of the present invention. On substrate 21, reflection layer 22, recording layer 23, lower dielectric layer 24, upper dielectric layer 25 and solid lubricating layer 26 are laminated.

Figure 3:
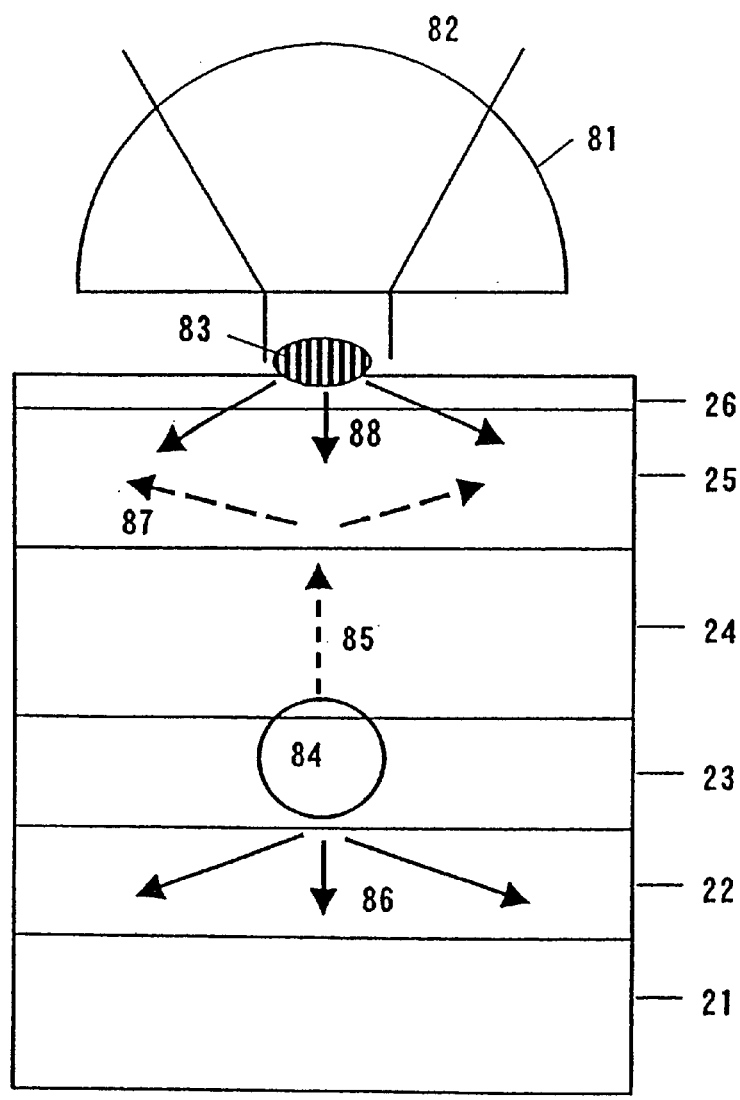
FIG. 3 shows a partial cross-sectional view illustrating thermal diffusion when a laser beam is irradiated from a SIL head on the second magneto-optical recording medium of the present invention and a dust particle on the surface thereof.

Illustrated in FIG. 3, in the present invention, thermal diffusion 85 from high temperature region 84 of recording layer 23 heated by laser beam 82 into the surface of a medium is reduced by decreasing of the thermal conductivity of lower dielectric layer 24. Further, in the present invention, by providing the thermal conductivity of upper dielectric layer 25 higher than that of lower dielectric layer 24, thermal diffusion 87 into the direction parallel to the layer positively becomes larger. Furthermore, it is provided that the total thickness of lower dielectric layer 24, upper dielectric layer 25 and solid lubricating layer 26 is not less than 90 nm. From these above, it can be able to reduce the temperature of the surface of a medium just under a laser beam. In the present invention, by reducing the thermal conductivity of lower dielectric layer 24, heat of recording layer 23 hardly diffuses therefrom, therefore, recording with a relatively low recording power can be performed, resulting in reduction of the laser power density on the surface of a medium. Moreover, in spite of absorption of irradiated laser beam by dust particle 83, elevation of the temperature is suppressed by increasing of thermal diffusion 88 into upper dielectric layer 25. Therefore, constant consecutive recording can be achieved without adhesion of dust particles to SIL lens 81.

In order to obtain sufficient effect of reduction of thermal diffusion from recording layer 23 to the surface of a medium and production of thermal diffusion in the direction parallel to the layer, it is preferred that the thermal conductivity of upper dielectric layer 25 is not less than twice as much as that of lower dielectric layer 24.

In order to inhibit thermal diffusion from recording layer 23 to the surface thereof sufficiently, it is preferred that the thermal conductivity of lower dielectric layer 24 is not more than $2 \times 10^5$ erg/(K.cm.s), more preferable not more than $1.5 \times 10^5$ erg/(K.cm.s). As for a material of a lower dielectric layer, such as glass materials having high refractive index, zirconium oxide, tantalum oxide containing hydrogen, silicon nitride containing hydrogen, and germanium nitride containing hydrogen can be mentioned. It is preferred that the thickness of lower dielectric layer 24 is not less than 20 nm, more preferably is not less than 50 nm.

As for a material with which a thin film having the thermal conductivity of not more than $2 \times 10^5$ erg/(K.cm.s) easily provided by film forming method such as sputtering method, ZnS containing $SiO_2$ in an amount of not less than 10 mole % and not more than 30 mole %, silicon nitride or germanium nitride these which are containing hydrogen in an amount of not less than 10 atom % and not more than 30 atom %, and $ZrO_2$ containing $SiO_2$ in an amount of not less than 10 mole % and not more than 30 mole % is preferably mentioned.

It is preferable that the thermal conductivity of upper dielectric layer 25 is higher than that of lower dielectric layer 24. As for a material with which a film having high thermal conductivity easily can be provided, diamond, boron nitride, beryllium oxide, aluminium nitride, silicon carbide, silicon nitride, and germanium nitride can be mentioned. It is preferred that an upper dielectric layer is composed of at least one material selected from the group described above. An upper dielectric layer is formed by such as sputtering method or CVD method.

In order to obtain the sufficient thermal diffusion effect, it is preferred that the thickness of upper dielectric layer 25 is not less than 50 nm, more preferably 80 nm.

With respect to the upper limitation of the thickness of upper dielectric layer and lower dielectric layer, preferred is not more than 1,000 nm, respectively, considering such as stress of a layer. It is able to balance the stress of an upper dielectric layer with that of a lower dielectric layer by changing a direction of the stress thereof. It is preferred that the total thickness of an upper dielectric layer, a lower dielectric layer and a solid lubricating layer is not more than 2,000 nm.

In order to suppress elevation of the temperature by thermal diffusion promoted by upper dielectric layer 25, which elevation of the temperature is due to dust particles' absorption of laser light on the surface of a medium, the thermal conductivity of upper dielectric layer 25 is preferably high, more preferably not less than $3 \times 10^5$ erg/(K.cm.s), most preferably not less than $5 \times 10^5$ erg/(K.cm.s).

The above high thermal conductivity is obtained with a material such as silicon nitride and germanium nitride by specific producing method. However, the thermal conductivity of not less than $5 \times 10^5$ erg/(K.cm.s) is easily obtained preferably with diamond by CVD method or boron nitride, beryllium oxide, aluminium nitride, silicon carbide, silicon nitride, and germanium nitride by sputtering method. It is able to add at least one element selected from the group of Ti, Zr, Hf, V, Nb, Ta, Cr, Mo, and W in an amount of not more than 10 atom % in order to improve durability.

With respect to the thickness and the refractive index of lower dielectric layer and upper dielectric layer, it is preferred that both of the refractive indexes of a lower dielectric layer (refractive index; $n_{43}$, thickness; $d_{43}$) and an upper dielectric layer (refractive index; $n_{44}$, thickness; $d_{44}$) are not less than 1.7. And it is also preferred that the refractive indexes and the thickness of these layers and the refractive index ($n_{45}$) and the thickness ($d_{45}$) of a solid lubricating layer satisfy a relationship represented by $$1 \text{ nm} \leq d_{45} \leq 50 \text{ nm, and}$$

$$0.6 \leq (d_{43} \cdot n_{43} + d_{44} \cdot n_{44} + d_{45} \cdot n_{45})/\lambda \leq 0.9 \text{ or}$$

$$1.2 \leq (d_{43} \cdot n_{43} + d_{44} \cdot n_{44} + d_{45} \cdot n_{45})/\lambda \leq 1.5,$$

wherein λ represents a wavelength of a reproducing laser. In the above condition, favorable SNR can be obtained. When both of the refractive indexes of an upper dielectric layer and a lower dielectric layer are small, the refractivity of the dielectric layer becomes large and noise is increased. Therefore, both of the refractive indexes of them is preferably not less than 1.7, more preferably not less than 1.7 and not more than 3.0.

Beside, between recording layer 23 and lower dielectric layer 24, antioxidant layer composed of such as silicon nitride and germanium nitride can be formed. The thermal conductivity of lower dielectric layer 24 and upper dielectric layer 25 can change consecutively, as long as the thermal conductivity increases from lower part to upper part in a dielectric layer 24. Preferably, the thermal conductivity of an upper dielectric layer is not less than twice as much as that of a lower dielectric layer.

The higher of the reflectivity of reflection layer 22, the higher of the intensity of a magneto-optical signal. Therefore, it is preferred that reflection layer 22 is composed of a metal film composed of an alloy mainly containing at least one metal selected from the group of a noble metal, Cu or Al in an amount not less than 90%.

From the above, in the present invention, by reducing the thermal conductivity of lower dielectric layer 24, heat of a recording layer hardly diffuses therefrom, therefore, recording with a relatively low recording power can be performed, resulting in reduction of the laser power density on the surface of a medium. In order to enhance the above effect, the thermal conductivity of reflection layer 22 is preferably reduced by adding impurities into a reflection layer as long as the reflectivity is not remarkably reduced, with the object of reduction of thermal diffusion 86 into the reflection layer and the substrate.

In order to prevent reduction of the reflectivity owing to addition of impurities, it is preferred that reflection layer 22 is provided by the lamination of primary reflection layer and secondary reflection layer in this order. In reflection layer 22, each of the thermal conductivity and the reflectivity of primary reflection layer is small and each of the thermal conductivity and the reflectivity of secondary reflection layer is large.

In order to reduce a recording power and to obtain an excellent SNR, preferred is that a reflection layer is three layered provided by the lamination of a thermal diffusion layer, a thermal insulating layer, and a reflection layer in the above order. The thermal diffusion layer can be composed of the same material as that of the reflection layer. The thermal diffusion layer can also be composed of a material having lower thermal conductivity than that of the reflection layer.

The thermal insulating layer is preferably composed of a dielectric such as silicon nitride and germanium nitride. With the structure of the above, the thickness of the thermal diffusion layer is preferably not less than 10 nm and not more than 60 nm. Also with the above structure, the thickness of the thermal insulating layer is preferably not less than 3 nm and not more than 50 nm, and the thickness of the reflection layer is preferably not less than 5 nm and not more than 40 nm.

It is preferred that a reflection layer and/or a thermal diffusion layer is composed of an alloy obtained by adding at least one element selected from the group of Ti, Zr, Hf, V, Nb, Ta, Cr, Mo, and W in an amount of from 0.1 to 10 atom % to Au. With the above Au alloy, the Au layer becomes sufficiently hard and its surface becomes smooth, therefore, a slider constantly flies above a medium and an excellent SNR is obtained.

It is also preferred that a reflection layer and/or a thermal diffusion layer is composed of an alloy of Au and Cu. With an alloy of Au and Cu, a slider constantly flies above a medium and excellent adhesion and SNR are obtained. It is more preferred that the above alloy contains Cu in an amount of not less than 0.1 atom % and not more than 95 atom %. Addition of Cu enhances adhesion of Au alloy to other layer, especially to dielectric layer.

It is also preferred that a reflection layer and/or a thermal diffusion layer is composed of an alloy containing Ag mainly, with regard to reproducing with a laser having a wavelength of not more than 550 nm. The above Ag containing alloy is preferably obtained by adding at least one element selected from the group of Au, Pt and Pd in an amount of from 0.1 to 10 atom % and at least one element selected from the group of Cu, Ti, Zr, Hf, V, Nb, Ta, Cr, Mo and W in an amount of from 0.1 to 10 atom % to Ag. With the above alloy, not only that thermal diffusion can be regulated, but also that these layers have more excellent characteristics of adhesion and anticorrosion and have an excellent SNR owing to the reduction of crystal size.

It is also preferred that an under metal film is provided as an underlayer between a substrate and a reflection layer or between a substrate and a thermal diffusion, in order to improve adhesion to a substrate and to improve anticorrosion. The above under metal film has a thickness of not less than 1 nm and not more than 30 nm and composed of at least one element selected from the group of Ti, Zr, Hf, V, Nb, Ta, Cr, Mo and W.

A solid lubricating layer of the first or second magneto-optical recording medium of the present invention (shown in FIG. 2 as 26) is a layer which suppress friction between a head and the surface of a medium at an instantly contact, and acts as a protection of a medium. As for a material of a solid lubricating layer, preferred are diamond-like carbon or oxide compounds such as $SiO_2$ and $Al_2O_3$. For obtaining these desired functions, the thickness of a solid lubricating layer is preferably not less than 1 nm, more preferably not less than 5 nm.

A solid lubricating layer composed of diamond-like carbon preferably has the thickness of not more than 50 nm. The thicker the DLC layer becomes, the more constantly a slider flies above a medium. However, with the large refractive index of the DLC layer, absorption is slightly occurred of a wavelength of not less than 600 nm. Therefore the thickness of the DLC layer is more preferably not more than 20 nm. A solid lubricating layer composed of silicon dioxide is able to have the thickness of not less than 10 nm because the silicon dioxide layer shows no absorption of a wavelength of around 400 nm. Though, a silicon dioxide layer is slightly inferior in constantly flying of a slider to a DLC layer. In the result, the thickness of the layer is preferably not more than 50 nm, because the incident laser beam with high angle is apt to scatter owing to the low refractive index around 1.5 of the layer. A solid lubricating layer is also provided by forming spontaneous oxidation by means of moderate impairment of film density around the surface of a dielectric layer. It is more preferable that an extremely thin liquid lubricating layer is further formed by coating such as perfluoropolyether on a solid lubricating.

A material of substrates 11, 21, is not limited as long as characteristics such as mechanical characteristics necessary for a substrate is provided. Such as glass, polycarbonate, amorphous polyolefin, engineering plastics can be used. It is preferred that the surface of a substrate is sufficiently smooth. Specifically, the surface roughness (Ra) (the centerline average roughness of a surface) of a substrate is preferably not more than 0.5 nm. The above surface roughness (Ra) is obtained by measuring the center area of the land between the adjacent recording tracks in the direction parallel to the track on a substrate. As for a measuring method, AFM (Atomic force microscope) can be used for example. It is preferred that the surface roughness (Ra) of a substrate is small. It is also preferred that heat treatment of a substrate is conducted in order to reduce Ra of a substrate which is usually around 0.7. Among heat treatments, lamp annealing using a lamp radiating infrared light is preferable. Because lamp annealing takes a short time such as a few seconds or a few minutes, and able to heat the surface of a substrate locally, therefore Ra of not more than 0.5 nm can be obtained without substantial damaging mechanical characteristics of a substrate. By using a substrate having the surface roughness (Ra) of not less than 0.5 nm and not more than 0.1 nm, it is observed that SNR of a medium is improved.

With respect to recording layers 13, 23, preferred is a magnetic film composed of a material having large perpendicular magnetic anisotropy and large coersivity such as TbFeCo, TbDyFeCo, and NdDyFeCo. The thickness of recording layers 13, 23 are preferably not less than 10 nm and not more than 200 nm. In case of one-layered recording layer, the thickness of recording layers 13, 23 are more preferably not less than 15 nm and not more than 30 nm with regard to SNR.

The structure of recording layers 13, 23 are not necessary composed of only one layer. A recording layer can be formed by lamination of a magnetic layer and a recording layer. The above magnetic layer has higher Curie temperature than that of a recording layer and has smaller coercivity which enhances recording magnetic field sensitivity than that of the recording layer. The above magnetic layer may be composed of a material selected from the group of such as GdFeCo, TbFeCo having a low Tb concentration and FeSiAl. A recording layer can also be formed by lamination of an intermediate layer and reproducing layer of the magnetically induced super-resolution, and a recording layer. Recording layers 13, 23 may be composed of a material in which anticorrosion element such as Cr, Ti, Zr, Nb and Ta for the purpose of anticorrosion, or Nd in an amount of several atom % for the purpose of increasing Karr rotational angle at a short wavelength of a laser.

Hereinbelow, the present invention will be described in the detail with reference to the following Examples, but they should not be construed as limiting the scope of the present invention.

In the following disclosure, unless otherwise specified, polycarbonate substrates having grooves (track pitch; 0.43 μm) were previously lamp-annealed and the surface roughness (Ra) of the substrate was provided as 0.3 nm.

EXAMPLE 1

Figure 4:
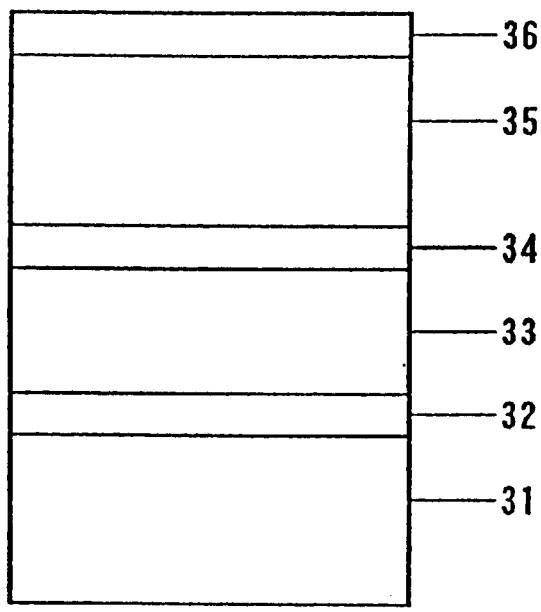
FIG. 4 shows one embodiment of a partial cross-sectional view of the first magneto-optical recording medium of the present invention, in which a reflection layer has a lower layer.

A near-field magneto-optical recording medium having a structure shown in FIG. 4 was produced in this example. After Cr underlayer 32 having a thickness of 5 nm was formed by DC sputtering on a polycarbonate substrate 31 having a groove (track pitch 0.43 μm), Au reflection layer 33 having a thickness of 60 nm was formed by DC sputtering on Cr underlayer 32. Then, TbFeCo (Curie temperature: 220° C.) recording layer 34 having a thickness of 20 nm was formed by DC sputtering on Au reflection layer 33. Further, on recording layer 34, primary dielectric layer 35 was formed by reactive DC sputtering using Si target in the atmosphere of mixed Ar,$N_2$ and $H_2$ gas at a thickness of 250 nm. The formed primary dielectric layer 35 was composed of silicon nitride containing hydrogen in an amount of approximately 20 atom %, which had a thermal conductivity of $8\times10^4$ erg/(K.cm.s) and a refractive index of 1.9. Furthermore, on primary dielectric layer 35, solid lubricating layer 36 was formed by reactive RF sputtering using C target in the atmosphere of mixed Ar and $H_2$ gas at a thickness of 10 nm finally, to obtain a magneto-optical recording medium. The formed solid lubricating layer 36 was composed of diamond-like carbon (DLC) which had a thermal conductivity of $3\times10^5$ erg/(K.cm.s) and a refractive index of 1.9. Using a reproducing laser having a wavelength (λ) of 685 nm, the optical film thickness $(d_{31} \cdot n_{31} + d_{32} \cdot n_{32})/\lambda$ of the obtained medium was 0.7, wherein $n_{31}$ and $d_{31}$ represent the refractive index and the thickness of primary dielectric layer 35, and $n_{32}$ and $d_{32}$ represent the refractive index and the thickness of solid lubricating layer 36.

Comparative Example 1

A magneto-optical recording medium was produced in the same manner as Example 1 with the exception that the thickness of primary dielectric layer 35 was 65 nm. The optical film thickness $(d_{31} \cdot n_{31} + d_{32} \cdot n_{32})/\lambda$ of the obtained medium was 0.21.

Comparative Example 2

A magneto-optical recording medium was produced in the same manner as Example 1 with the exception that the thickness of primary dielectric layer 35 was 120 nm. The optical film thickness $(d_{31} \cdot n_{31} + d_{32} \cdot n_{32})/\lambda$ of the obtained medium was 0.36.

EXAMPLE 2

A magneto-optical recording medium was produced in the same manner as Example 1 with the exception that the thickness of primary dielectric layer 35 was 180 nm. The optical film thickness $(d_{31} \cdot n_{31} + d_{32} \cdot n_{32})/\lambda$ of the obtained medium was 0.53.

EXAMPLE 3

A magneto-optical recording medium was produced in the same manner as Example 1 with the exception that the thickness of primary dielectric layer 35 was 235 nm. The optical film thickness $(d_{31} \cdot n_{31} + d_{32} \cdot n_{32})/\lambda$ of the obtained medium was 0.68.

EXAMPLE 4

A magneto-optical recording medium was produced in the same manner as Example 1 with the exception that the thickness of primary dielectric layer 35 was 265 nm. The optical film thickness $(d_{31} \cdot n_{31} + d_{32} \cdot n_{32})/\lambda$ of the obtained medium was 0.76.

EXAMPLE 5

A magneto-optical recording medium was produced in the same manner as Example 1 with the exception that the thickness of primary dielectric layer 35 was 300 nm. The optical film thickness $(d_{31} \cdot n_{31} + d_{32} \cdot n_{32})/\lambda$ of the obtained medium was 0.86.

EXAMPLE 6

A magneto-optical recording medium was produced in the same manner as Example 1 with the exception that the thickness of primary dielectric layer 35 was 440 nm. The optical film thickness $(d_{31} \cdot n_{31} + d_{32} \cdot n_{32})/\lambda$ of the obtained medium was 1.25.

The recording/reproduction characteristics of magneto-optical recording media produced in Examples 1 to 6 and Comparative Examples 1 to 2 were then measured.

In an evaluation apparatus, a sample medium is rotationally driven at a constant linear velocity of 10 m/s. A solid immersion lens (SIL) head (slider) (wavelength of the laser: 685 nm, effective numerical aperture (NA): 1.3) was set on the plurality of the layers of the sample medium to fly adjusting the air gap between the head and the medium to 50 nm. By irradiating a pulsed laser beam onto a medium intermittently (modulation frequency: 90 MHz), a recording layer of the irradiated medium was heated at a temperature higher than Curie temperature of the recording layer. Then, on the recording layer, 8T signal having a mark length of 0.92 μm was recorded while modulating a coil magnetic field on the SIL head at a frequency of 5.6 MHz followed by recording of 2T signal having a mark length of 0.23 μm while modulating a coil magnetic field on the SIL head at a frequency of 22.5 MHz. The range of modulation of above magnetic field was ±130 Oe. After recording, by reproducing a recorded signal using a laser beam having a laser power of 1.3 mW, an SNR of 8T signal was measured by a digital oscilloscope and a resolution (intensity ratio of 2T signal by 8T signal (2T/8T)) was measured by a spectrum analyzer.

If it was impossible to record a signal in one round of a medium (disk) owing to a disordered tracking error signal, the reproduction characteristics were measured by recording in a range of not more than 1/10 round of a medium (disk).

The results of these measurements are shown in Table 1.

The evaluation of recording capability for one round of a medium (disk) was indicated on the basis of the following criteria;

×: Unable to record in the range of not less than one round of a medium (disk),

Δ: Able to record at the optimum recording power through one round of a medium (disk) and unable to follow a track after recording for one round of a medium (disk).

The evaluation of spiral consecutive recording capability following a track for one hour was indicated on the basis of the following criteria;

×: Unable to record by an original tracking error or unable to record by a tracking error owing to formed dust particles.

TABLE 1

|  | Thickness of primary dielectric layer (nm) | Optical film thickness (nm) | Thermal insulating ratio (cm²Ks/erg) | Thermal diffusion ratio (erg/Ks) | One round disk recording capability | Consecutive recording capability | SNR (dB) | Resolution (%) |
|---|---|---|---|---|---|---|---|---|
| Example 1 | 250 | 0.72 | 2.9 × 10⁻¹⁰ | 2.3 | ○ | ○ | 26 | 26 |
| Example 2 | 180 | 0.53 | 2.1 × 10⁻¹⁰ | 1.7 | ○ | ○ | 18 | 19 |
| Example 3 | 235 | 0.68 | 2.8 × 10⁻¹⁰ | 2.2 | ○ | ○ | 24 | 24 |
| Example 4 | 265 | 0.76 | 3.1 × 10⁻¹⁰ | 2.4 | ○ | ○ | 24 | 26 |
| Example 5 | 300 | 0.86 | 3.6 × 10⁻¹⁰ | 2.7 | ○ | ○ | 17 | 22 |
| Example 6 | 440 | 1.25 | 5.3 × 10⁻¹⁰ | 3.8 | ○ | ○ | 25 | 25 |
| Com. Example 1 | 65 | 0.21 | 6.9 × 10⁻¹¹ | 0.8 | x | x | 27 | 25 |
| Com. Example 2 | 120 | 0.36 | 1.3 × 10⁻¹⁰ | 1.3 | Δ | x | 22 | 16 |

Comparing Examples 1 to 6 with Comparative Examples 1 to 2, it is found that spiral consecutive recording can be carried with a medium (disk) having a thickness of the primary dielectric layer of not less than 180 nm. Besides, a medium (disk) having a thickness of the primary dielectric layer of from 235 nm to 265 nm (thickness of optical layer; not less than 0.68 and not more than 0.76) or 440 nm shows an SNR of not less than 24 dB and a resolution of not less than 24%. As for SNR and resolution, excellent results as good as these of a medium having a thickness of the primary dielectric layer of 65 nm are obtained.

EXAMPLE 7

Figure 5:
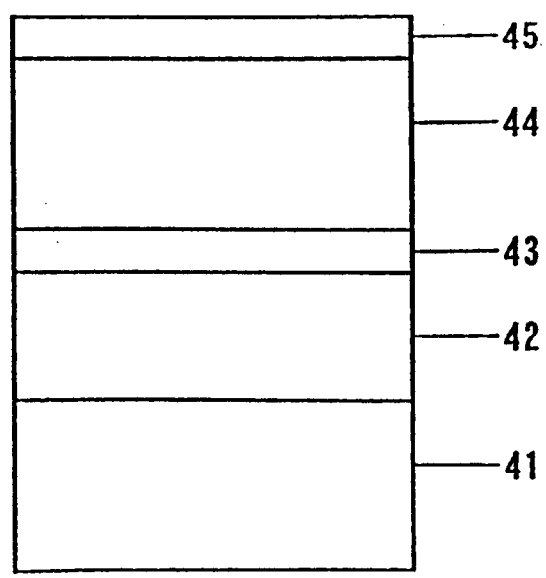
FIG. 5 shows one embodiment of a partial cross-sectional view of the first magneto-optical recording medium of the present invention, in which a medium has primary dielectric layer and a solid lubricating layer.

A near-field magneto-optical recording medium having a structure shown in FIG. 5 was produced in this example.

On a polycarbonate substrate 41 having a groove (track pitch 0.43 μm), $Ag_{0.98}Pd_{0.01}Cu_{0.01}$ reflection layer 42 having a thermal conductivity of $3 \times 10^7$ erg/(K.cm.s) was formed by DC sputtering at a thickness of 60 nm. Then, TbFeCo (Curie temperature: 220° C.) recording layer 43 was formed by DC sputtering on reflection layer 42 at thickness of 20 nm. Further, on recording layer 43, primary dielectric layer 44 was formed by reactive DC sputtering using Si target in the atmosphere of mixed Ar and $N_2$ gas at a thickness of 230 nm. The formed primary dielectric layer 44 was composed of silicon nitride which had a thermal conductivity of $3 \times 10^5$ erg/(K.cm.s) and a refractive index of 2.1. Furthermore, on primary dielectric layer 44, solid lubricating layer 45 was formed by reactive RF sputtering using C target in the atmosphere of mixed Ar and $H_2$ gas at a thickness of 10 nm finally, to obtain a magneto-optical recording medium. The formed solid lubricating layer 45 was composed of DLC which had a thermal conductivity of $3 \times 10^5$ erg/(K.cm.s) and a refractive index of 2.0. Using a reproducing laser having a wavelength ($\lambda$) of 685 nm, the optical film thickness $(d_{31} \cdot n_{31} + d_{32} \cdot n_{32})/\lambda$ of the obtained medium was 0.73, wherein $n_{31}$ and $d_{31}$ represent the refractive index and the thickness of primary dielectric layer 44, and $n_{32}$ and $d_{32}$ represent the refractive index and the thickness of solid lubricating layer 45.

Comparative Example 3

A magneto-optical recording medium was produced in the same manner as Example 7 with the exception that the thickness of primary dielectric layer 44 was 65 nm. The optical film thickness $(d31 \cdot n_{31} + d_{32} \cdot n_{32})/\lambda$ of the obtained medium was 0.23.

EXAMPLE 8

A magneto-optical recording medium was produced in the same manner as Example 7 with the exception that primary dielectric layer 44 was composed of germanium nitride having a thermal conductivity of $4 \times 10^5$ erg/(K.cm.s) and a refractive index of 2.0 and the thickness of primary dielectric layer 44 was 240 nm. The optical film thickness $(d_{31} \cdot n_{31} + d_{32} \cdot n_{32})/\lambda$ of the obtained medium was 0.73.

EXAMPLE 9

A magneto-optical recording medium was produced in the same manner as Example 7 with the exception that solid lubricating layer 45 was composed of silicon dioxide having a thermal conductivity of $1 \times 10^5$ erg/(K.cm.s) and a refractive index of 1.45 and the thickness of solid lubricating layer 45 was 10 nm. The optical film thickness $(d_{31} \cdot n_{31} + d_{32} \cdot n_{32})/\lambda$ of the obtained medium was 0.73.

The recording/reproduction characteristics of magneto-optical recording media produced in Examples 7 to 9 and Comparative Example 3 were measured in the same manner used for these produced in Examples 1 to 6 and Comparative Examples 1 to 2. The results of these measurements are shown in Table 2.

thermal diffusion layer 52, thermal insulating layer 53 composed of silicon nitride was formed by reactive DC sputtering using Si target in the atmosphere of mixed Ar and $N_2$ gas at a thickness of 20 nm. Further, on thermal insulating layer 53, $Ag_{0.98}Pd_{0.01}Cu_{0.01}$ reflection layer 54 was formed by DC sputtering at a thickness of 40 nm. Furthermore, TbFeCo (Curie temperature: 220° C.) recording layer 55 was formed by DC sputtering on reflection layer 54 at a thickness of 20 nm. Furthermore, on recording layer 55, primary dielectric layer 56 was formed by reactive DC sputtering using Si target in the atmosphere of mixed Ar and $N_2$ gas at a thickness of 230 nm. The formed primary dielectric layer 56 was composed of silicon nitride which had a thermal conductivity of $3 \times 10^5$ erg/(K.cm.s) and a refractive index of 2.1. Furthermore, on primary dielectric layer 56, solid lubricating layer 57 was formed by reactive RF sputtering using C target in the atmosphere of mixed Ar and $H_2$ gas at a thickness of 20 nm finally, to obtain a magneto-optical recording medium. The formed solid lubricating layer 57 was composed of DLC which had a thermal conductivity of $3 \times 10^5$ erg/(K.cm.s) and a refractive index of 2.0. Using a reproducing laser having a wavelength ($\lambda$) of 685 nm, the optical film thickness $(d_{31} \cdot n_{31} + d_{32} \cdot n_{32})/\lambda$ of the obtained medium was 0.76, wherein $n_{31}$ and $d_{31}$ represent the refractive index and the thickness of primary dielectric layer 56, and $n_{32}$ and $d_{32}$ represent the refractive index and the thickness of solid lubricating layer 57.

EXAMPLE 11

A magneto-optical recording medium was produced in the same manner as Example 10 with the exception that thermal insulating layer 53 was composed of Cr having a thickness of 10 nm. The optical film thickness $(d_{31} \cdot n_{31} + d_{32} \cdot n_{32})/\lambda$ of the obtained medium was 0.76.

It is found that spiral consecutive recording can be carried on media (disks) of Examples 10 and 11, while both of media (disks) of Examples 10 and 11 showing an SNR of 27

TABLE 2

| | Material of primary dielectric layer | Material of solid lubricating layer | Optical film thickness (nm) | Thermal insulating ratio (cm²Ks/erg) | Thermal diffusion ratio (erg/Ks) | One round disk recording capability | Consecutive recording capability | SNR (dB) | Resolution (%) |
|---|---|---|---|---|---|---|---|---|---|
| Example 7 | silicon nitride | DLC | 0.73 | $8.0 \times 10^{-11}$ | 7.2 | ○ | ○ | 27 | 27 |
| Example 8 | germanium nitride | DLC | 0.73 | $6.3 \times 10^{-11}$ | 9.9 | ○ | ○ | 26 | 26 |
| Example 9 | silicon nitride | silicon dioxide | 0.73 | $8.2 \times 10^{-11}$ | 7.0 | ○ | ○ | 26 | 26 |
| Com. Example 3 | silicon nitride | DLC | 0.23 | $2.5 \times 10^{-11}$ | 2.3 | x | x | 27 | 26 |

Comparing Examples 7 to 9 with Comparative Example 3, it is found that spiral consecutive recording can be carried on media (disks) of Examples 7to 9, while media (disks) of Examples 7 to 9 showing a SNR of not less than 26 dB and a resolution of not less than 25%. On the contrary, it was not able to record in the range of not less than one round of a disk on a medium (disk) of Comparative Example 3.

EXAMPLE 10

Figure 6:
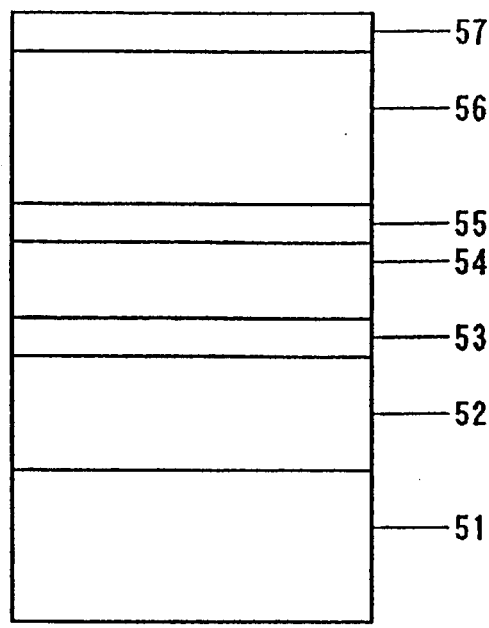
FIG. 6 shows one embodiment of a partial cross-sectional view of the first magneto-optical recording medium of the present invention, in which a reflection layer has a thermal insulating layer and a thermal diffusion layer.

A near-field magneto-optical recording medium having a structure shown in FIG. 6 was produced in this example.

On a polycarbonate substrate 51 having a groove (track pitch 0.43 μm), $Ag_{0.98}Pd_{0.01}Cu_{0.01}$ thermal diffusion layer 52 having a thermal conductivity of $3 \times 10^7$ erg/(K.cm.s) was formed by DC sputtering at a thickness of 50 nm. Then, on dB and a resolution of 26%. Besides, 2T signal noise of media of Examples 10 and 11 were improved. That is, 2T recording noise of the medium of Example 10 was improved by 2 dB compared with that of Example 7, and 2T recording noise of the medium of Example 11 was improved by 1 dB compared with that of Example 7. The SNR of 2T signal of Example 10 was 16 dB and that of Example 11 was 15 dB.

The optimum recording power of the medium of Example 7 was 15 mW, and crosstalk of 8T signal was −23 dB at the optimum power. The optimum recording power of the medium of Example 10 was 14 mW, and crosstalk of 8T signal was −25 dB at the optimum recording power. Both of crosstalks were in the range that the error rate of not more than −20 dB is effected by 10% of increase of recording power.

EXAMPLE 12

A magneto-optical recording medium was produced in the same manner as Example 7 with the exception that reflection layer 42 was composed of $Ag_{0.98}Pd_{0.01}Ti_{0.01}$ having a thermal conductivity of $1\times10^7$ erg/(K.cm.s) formed by DC sputtering at a thickness of 35 nm on substrate 41.

EXAMPLE 13

A magneto-optical recording medium was produced in the same manner as Example 7 with the exception that reflection layer 42 was formed on substrate 41. The formed reflection layer 42 was composed of two layers including $Ag_{0.96}Pd_{0.02}Cu_{0.02}$ primary reflection layer having a thickness of 30 nm and a thermal conductivity of $5\times10^6$ erg/(K.cm.s) and $Ag_{0.09}Pd_{0.01}Cu_{0.01}$ secondary reflection layer having a thickness of 10 nm and a thermal conductivity of $3\times10^7$ erg/(K.cm.s).

The results of these measurements are shown in Table 3.

Comparing with Examples 7 and 11, remarkable improvements in recording power and crosstalk of Examples 12 to 15 were found while having SNRs of not less than these of Examples 7 and 11. In Example 15, in spite of higher Curie temperature of the recording layer, substantial recording sensitivity and crosstalk were improved remarkably by virtue of the two-layered structure of the recording layer. Because, the structure of two recording layers improves the magnetic field sensitivity resulting in reduction of recording noise in the low range of the recording power. In Example 16, comparing with Example 12, SNR was remarkably reduced showing the surface roughness (Ra) of the substrate effects SNR obviously.

TABLE 3

| | Recording power (mW) | 8T SNR (dB) | Thermal insulating ratio (cm²Ks/erg) | Thermal diffusion ratio (erg/Ks) | 2T SNR (dB) | Crosstalk | Consecutive recording capability |
|---|---|---|---|---|---|---|---|
| Example 7  | 15 | 27 | $8.0 \times 10^{-11}$ | 7.2 | 14 | −23 | ○ |
| Example 10 | 14 | 27 | $8.0 \times 10^{-11}$ | 7.2 | 16 | −25 | ○ |
| Example 11 | 16 | 26 | $8.0 \times 10^{-11}$ | 7.2 | 15 | −24 | ○ |
| Example 12 | 10 | 27 | $8.0 \times 10^{-11}$ | 7.2 | 16 | −32 | ○ |
| Example 13 | 9  | 26 | $8.0 \times 10^{-11}$ | 7.2 | 16 | −33 | ○ |
| Example 14 | 8  | 26 | $8.3 \times 10^{-11}$ | 7.5 | 17 | −35 | ○ |
| Example 15 | 7  | 27 | $8.0 \times 10^{-11}$ | 7.2 | 18 | −40 | ○ |

EXAMPLE 14

A magneto-optical recording medium was produced in the same manner as Example 10 with the exception that a Cr underlayer having a thickness of 5 nm, thermal diffusion layer 52 (thickness: 30 nm) composed of $Au_{0.99}Cu_{0.01}$ having a thermal conductivity of $8\times10^6$ erg/(K.cm.s), thermal insulating layer 53 (thickness: 20 nm) composed of silicon nitride having a refractive index of 2.1 and reflection layer 54 (thickness: 20 nm) composed of $Au_{0.99}Cu_{0.01}$, were formed on substrate 51.

EXAMPLE 15

A magneto-optical recording medium was produced in the same manner as Example 7 with the exception as follows.

On substrate 41, reflection layer 32 composed of $Ag_{0.98}Pt_{0.01}Zr_{0.01}$ having a thermal conductivity of $8\times10^6$ erg/(K.cm.s) was formed by DC sputtering at a thickness of 35 nm. On reflection layer 32, recording layer 43 was formed, which layer includes an auxiliary layer (thickness: 3 nm) composed of $Tb_{0.15}Fe_{0.73}Co_{0.12}$ (Curie temperature: 300° C.) and primary recording layer (thickness: 20 nm) composed of $Tb_{0.23}Fe_{0.67}Co_{0.10}$ (Curie temperature: 240° C.) formed by DC sputtering.

EXAMPLE 16

A magneto-optical recording medium was produced in the same manner as Example 12 with the exception that use was made of the substrate provided without lamp-annealing treatment and the substrate had 0.6 nm of the surface roughness (Ra).

The recording/reproduction characteristics such as recording power, SNR, and crosstalk of magneto-optical recording media produced in Examples 12 to 15 were measured.

In the magneto-optical recording media of Examples 1 to 16, the thermal insulating ratio of a dielectric layer ($d_3/\rho$) and the thermal diffusion ratio of a dielectric layer ($\rho d_3$) satisfy a relationship represented by $$d_3/\rho \geq 3\times10^{-11} \text{ cm}^2\text{Ks/erg, and}$$

$$\rho d_3 \geq 1.5 \text{ erg/Ks}.$$

Therefore, it was possible to record consecutively on these media.

The surface roughness (Ra) of the media (solid lubricating layers) of Examples 7, 12 and 16 measured by AFM were 1.2 nm, 1.0 nm and 1.7 nm respectively. It is considered that, in Example 16, SNR was reduced by the inferior surface roughness (Ra) of the media adversely affected by the surface roughness (Ra) of the substrate.

EXAMPLE 17

Figure 7:
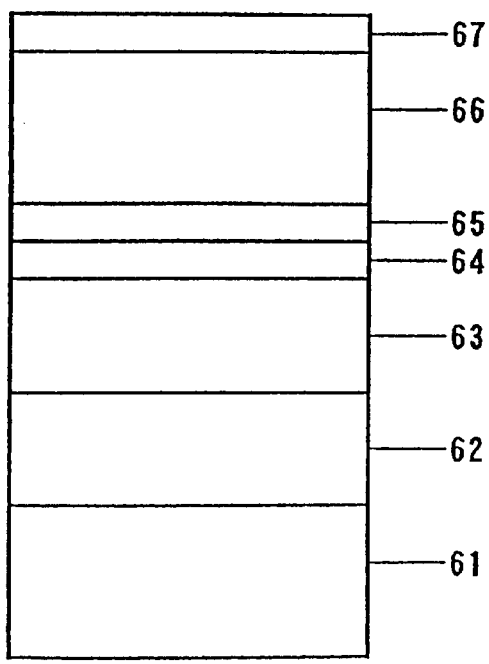
FIG. 7 shows one embodiment of a partial cross-sectional view of the first magneto-optical recording medium of the present invention, in which a recording layer has a reproducing layer and a intermediate layer.

A near-field magneto-optical recording medium having a structure shown in FIG. 7 was produced in this example.

On a polycarbonate substrate 61 having a groove (track pitch 0.35 μm), $Ag_{0.98}Pd_{0.01}Cu_{0.01}$ reflection layer 62 was formed by DC sputtering at a thickness of 60 nm. On reflection layer 62, TbFeCo (Curie temperature: 200° C.) recording layer 63 was formed by DC sputtering at a thickness of 50 nm. Then, on recording layer 63, $Ag_{0.98}Pd_{0.01}Cu_{0.01}$ intermediate layer 64 was formed by DC sputtering at a thickness of 20 nm. Further, on intermediate layer 64, GdFeCo (rich in rare-earth element) reproducing layer 65 was formed. The formed reproducing layer 65 is inplane magnetized at room temperature and perpendicularly magnetized at a temperature of not less than 120° C. Furthermore, on reproducing layer 65, primary dielectric layer 66 was formed by reactive DC sputtering using Si target in the atmosphere of mixed Ar, $N_2$ and $H_2$ gas at a thickness of 160 nm. The formed primary dielectric layer 66 was composed of silicon nitride containing hydrogen in an amount of approximately 20 atom %, which had a refractive index of 1.9. Furthermore, on primary dielectric layer 66, solid lubricating layer 67 was formed by reactive RF sputtering at a thickness of 10 nm finally, to obtain a magneto-optical recording medium. The formed solid lubricating layer 67 was composed of silicon dioxide having a refractive index of 1.45. Using a reproducing laser having a wavelength ($\lambda$) of 400 nm, the optical film thickness $(d_{31} \cdot n_{31} + d_{32} \cdot n_{32})/\lambda$ of the obtained medium was 0.80, wherein $n_{31}$ and $d_{31}$ represent the refractive index and the thickness of primary dielectric layer 66, and $n_{32}$ and $d_{32}$ represent the refractive index and the thickness of solid lubricating layer 67.

The recording/reproduction characteristics of magneto-optical recording medium produced in Example 17 was then measured. In an evaluation apparatus, a sample medium is rotationally driven at a constant linear velocity of 10 m/s. A SIL head (slider) (wavelength of the laser: 400 nm, effective NA: 1.3) was set on the plurality of the layers of the sample medium to fly adjusting the air gap between the head and the medium to 20 nm. By irradiating a pulsed laser beam onto a medium modulated at a frequency of 160 MHz, a primary recording layer of the irradiated medium was heated at a temperature higher than Curie temperature of the recording layer. Then, on the recording layer, 8T signal having a mark length of 0.5 $\mu$m was recorded while modulating a coil magnetic field on the SIL head at a frequency of 10 MHz followed by recording of 2T signal having a mark length of 0.12 $\mu$m while modulating a coil magnetic field on the SIL head at a frequency of 40 MHz. The range of modulation of above magnetic field was ±150 Oe. After recording, by reproducing a recorded signal using a laser beam having a power of 1.3 mW, an SNR of 8T signal was measured by a digital oscilloscope and a resolution (intensity ratio of 2T signal by 8T signal (2T/8T)) was measured by a spectrum analyzer.

As for the recording/reproduction characteristics of magneto-optical recording medium (disk) produced in Example 17, SNR of the medium was 23 dB and resolution of the medium was 50% excellent because of the super-resolution. Also, it is found that spiral consecutive recording can be carried on the medium (disk) of Example 17.

EXAMPLE 18

Figure 8:
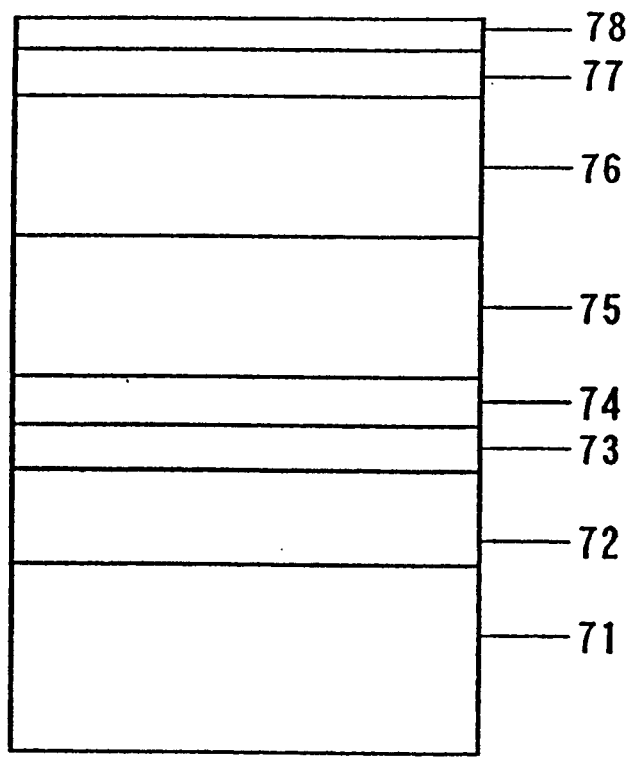
FIG. 8 shows one embodiment of a partial cross-sectional view of the second magneto-optical recording medium of the present invention, in which a recording layer has an auxiliary recording layer and primary recording layer.

A near-field magneto-optical recording medium having a structure shown in FIG. 8 was produced in this example.

On a polycarbonate substrate 71 having a groove (track pitch 0.45 $\mu$m), $Ag_{0.98}Pd_{0.01}Ti_{0.01}$ reflection layer 72 was formed by DC sputtering at a thickness of 35 nm. On reflection layer 72, $Tb_{0.23}Fe_{0.67}Co_{0.10}$ primary recording layer 73 was formed by DC sputtering at a thickness of 20 nm. Then, on primary recording layer 73, $Tb_{0.15}Fe_{0.73}Co_{0.12}$ auxiliary recording layer 74 was formed by DC sputtering at a thickness of 3 nm. Further, on auxiliary recording layer 74, lower dielectric layer 75 was formed by RF sputtering at a thickness of 130 nm. The formed lower dielectric layer 75 was composed of ZnS containing $SiO_2$ in an amount of 20 mole % which had a thermal conductivity of $6 \times 10^4$ erg/(K.cm.s) and a refractive index of 2.2. Further, on lower dielectric layer 75, upper dielectric layer 76 was formed by reactive DC sputtering using Si target in the atmosphere of mixed Ar and $N_2$ gas at a thickness of 100 nm. The formed upper dielectric layer 76 was composed of silicon nitride having a thermal conductivity of $3 \times 10^5$ erg/(K.cm.s) and a refractive index of 2.1. Furthermore, on upper dielectric layer 76, solid lubricating layer 77 was formed by reactive RF sputtering at a thickness of 10 nm. The formed solid lubricating layer 77 was composed of diamond-like carbon (DLC) having a refractive index of 2.0. Furthermore, on solid lubricating layer 77, perfluoropolyether type liquid lubricating layer 78 was formed by dip-coating at a thickness of 1 nm finally, to obtain a surface reading type magneto-optical recording medium. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.75

Comparative Example 4

A surface reading type magneto-optical recording medium was produced in the same manner as Example 18 with the exception that the thickness of lower dielectric layer 75 was 30 nm and the thickness of upper dielectric layer 76 was 30 nm. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.22.

EXAMPLE 19

A surface reading type magneto-optical recording medium was produced in the same manner as Example 18 with the exception that the thickness of lower dielectric layer 75 was 40 nm and the thickness of upper dielectric layer 76 was 80 nm. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.40.

EXAMPLE 20

A surface reading type magneto-optical recording medium was produced in the same manner as Example 18 with the exception that the thickness of lower dielectric layer 75 was 50 nm and the thickness of upper dielectric layer 76 was 100 nm. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.50.

EXAMPLE 21

A surface reading type magneto-optical recording medium was produced in the same manner as Example 18 with the exception that the thickness of lower dielectric layer 75 was 80 nm and the thickness of upper dielectric layer 76 was 120 nm. Using a reproducing laser having a-wavelength ($\lambda$) of 685 nm, the optical film thickness $(d_3 \cdot n_3 + d_4 \cdot n_4 + d_5 \cdot n_5)/\lambda$ of the obtained medium was 0.63.

EXAMPLE 22

A surface reading type magneto-optical recording medium was produced in the same manner as Example 18 with the exception that the thickness of lower dielectric layer 75 was 200 nm and the thickness of upper dielectric layer 76 was 220 nm. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 1.29.

EXAMPLE 23

A surface reading type magneto-optical recording medium was produced in the same manner as Example 18 with the exception as follows. Lower dielectric layer 75 was formed by reactive DC sputtering using Si target in the atmosphere of mixed Ar, $N_2$ and $H_2$ gas at a thickness of 140 nm. The formed lower dielectric layer 75 was composed of silicon nitride containing hydrogen in an amount of 20 atom % and had a thermal conductivity of $8 \times 10^4$ erg/(K.cm.s) and a refractive index of 2.1. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.76.

EXAMPLE 24

A surface reading type magneto-optical recording medium was produced in the same manner as Example 18 with the exception as follows. Lower dielectric layer 75 was formed by RF sputtering at a thickness of 140 nm. The formed lower dielectric layer 75 was composed of $ZrO_2$ containing $SiO_2$ in an amount of 20 mole % and had a thermal conductivity of $7 \times 10^4$ erg/(K.cm.s) and a refractive index of 2.1. Using are producing laser having a wavelength ($\lambda$) of 685 nm, the optical film thickness $(d_3 \cdot n_3 + d_4 \cdot n_4 + d_5 \cdot n_5)/\lambda$ of the obtained medium was 0.76.

EXAMPLE 25

A surface reading type magneto-optical recording medium was produced in the same manner as Example 18 with the exception as follows. Upper dielectric layer 76 was formed by reactive DC sputtering using Al target in the atmosphere of mixed Ar and $N_2$ gas at a thickness of 105 nm. The formed upper dielectric layer 76 was composed of aluminum nitride and had a thermal conductivity of $2 \times 10^6$ erg/(K.cm.s) and a refractive index of 2.0. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.75.

EXAMPLE 26

A surface reading type magneto-optical recording medium was produced in the same manner as Example 18 with the exception as follows. Upper dielectric layer 76 was formed by reactive DC sputtering using $Al_{0.9}Si_{0.1}$ target in the atmosphere of mixed Ar and $N_2$ gas at a thickness of 105 nm. The formed upper dielectric layer 76 was composed of silicon-aluminum nitride and had a thermal conductivity of $1 \times 10^6$ erg/(K.cm.s) and a refractive index of 2.0. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.75.

EXAMPLE 27

A surface reading type magneto-optical recording medium was produced in the same manner as Example 18 with the exception as follows. Lower dielectric layer 75 was formed by RF sputtering at a thickness of 30 nm. The formed lower dielectric layer 75 was composed of ZnS containing $SiO_2$ in an amount of 20 mole % and had a thermal conductivity of $6 \times 10^4$ erg/(K.cm.s) and a refractive index of 2.2. Upper dielectric layer 76 was formed by reactive DC sputtering using Al target in the atmosphere of mixed Ar and $N_2$ gas at a thickness of 60 nm. The formed upper dielectric layer 76 was composed of aluminum nitride having a thermal conductivity of $2 \times 10^6$ erg/(K.cm.s) and a refractive index of 2.0. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.31.

EXAMPLE 28

A surface reading type magneto-optical recording medium was produced in the same manner as Example 18 with the exception as follows. Upper dielectric layer 76 was formed by RF sputtering using sinter target of boron nitride in the atmosphere of mixed Ar and $N_2$ gas at a thickness of 105 nm. The formed upper dielectric layer 76 was composed of boron nitride having a thermal conductivity of $2 \times 10^6$ erg/(K.cm.s) and a refractive index of 2.0. Using a reproducing laser having a wavelength ($\lambda$) of 685 nm, the optical film thickness $(d_3 \cdot n_3 + d_4 \cdot n_4 + d_5 \cdot n_5)/\lambda$ of the obtained medium was 0.75.

The recording/reproduction characteristics of magneto-optical recording medium produced in Examples 12, 18 to 28 and Comparative Example 4 were then measured.

In an evaluation apparatus, a sample medium is rotationally driven at a constant linear velocity of 10 m/s. A SIL head (slider) (wavelength of the laser: 685 nm, effective NA: 1.2) was set on the plurality of the layers of the sample medium to fly adjusting the air gap between the head and the medium to 80 nm. By irradiating a pulsed laser beam onto a medium modulating at a frequency of 72 MHz, a primary recording layer of the irradiated medium was heated at a temperature higher than Curie temperature of the material of the primary recording layer. Then, on the recording layer, 2T signal having a mark length of 0.28 $\mu$m was recorded while modulating a coil magnetic field on the SIL head at a frequency of 18 MHz. The range of modulation of above magnetic field was ±130 Oe. After recording, by reproducing a recorded signal using a laser beam having a power of 1 mW, carrier and noise of 19 MHz were measured with a resolution band width of 30 kHz, by which carrier to noise ratio (CNR) was obtained. CNR was measured changing a recording power to obtain the optimum recording power with which maximum CNR was obtained.

Then with the optimum recording power, consecutive recording of 10,000 tracks was conducted for 10 times on each of sample medium. The evaluation was indicated as the number of times of completed consecutive recordings without any tracking errors and the number of times of completed consecutive recordings without any tracking errors but with slightly defective tracking error signals.

The results of these measurements are shown in Table 4.

TABLE 4

| | Lower dielectric layer (Thickness:nm) | Upper dielectric layer (Thickness:nm) | $(d_3 \cdot n_3 + d_4 \cdot n_4 + d_5 \cdot n_5)/\lambda$ | CNR (dB) | optimum power (mW) | number of times of completed consecutive recording | number of times of observed defective tracking error signals |
|---|---|---|---|---|---|---|---|
| Example 12 | — | SiN (230) | 0.73 | 44 | 10 | 10 | 8 |
| Example 18 | ZnS—$SiO_2$ (130) | SiN (100) | 0.75 | 45 | 6 | 10 | 1 |

TABLE 4-continued

| | Lower dielectric layer (Thickness:nm) | Upper dielectric layer (Thickness:nm) | $(d_3 \cdot n_3 + d_4 \cdot n_4 + d_5 \cdot n_5)/\lambda$ | CNR (dB) | optimum power (mW) | number of times of completed consecutive recording | number of times of observed defective tracking error signals |
|---|---|---|---|---|---|---|---|
| Example 19 | ZnS—SiO$_2$ (40) | SiN (80) | 0.40 | 41 | 7 | 10 | 3 |
| Example 20 | ZnS—SiO$_2$ (50) | SiN (100) | 0.50 | 40 | 7 | 10 | 2 |
| Example 21 | ZnS—SiO$_2$ (80) | SiN (120) | 0.63 | 43 | 7 | 10 | 2 |
| Example 22 | ZnS—SiO$_2$ (200) | SiN (220) | 1.29 | 43 | 8 | 10 | 2 |
| Example 23 | SiH:H (140) | SiN (100) | 0.76 | 45 | 6 | 10 | 1 |
| Example 24 | ZrO$_2$—SiO$_2$ (140) | SiN (100) | 0.76 | 45 | 6 | 10 | 1 |
| Example 25 | ZnS—SiO$_2$ (130) | AlN (105) | 0.75 | 46 | 7 | 10 | 0 |
| Example 26 | ZnS—SiO$_2$ (130) | AlSiN (105) | 0.75 | 46 | 6 | 10 | 0 |
| Example 27 | ZnS—SiO$_2$ (30) | AlN (60) | 0.31 | 42 | 5 | 10 | 3 |
| Example 28 | ZnS—SiO$_2$ (130) | BN (105) | 0.75 | 46 | 7 | 10 | 0 |
| Com. Example 4 | ZnS—SiO$_2$ (30) | SiN (30) | 0.22 | 45 | 5 | 0 | 10 |

In Example 12, 10 times of a consecutive recording were conducted completely, however slight tracking error signals were observed in 8 times.

The optimum power of Example 18 was approximately 4 mW lower than that of Example 12, therefore the presence of lower dielectric layer was effective in a recording power. Also, in Example 18, the number of times of observed defective tracking error signals were reduced and the degree of their disorder was slight.

In Examples 18 to 22, though the thickness of lower dielectric layer and upper dielectric layer were changed, 10 times of a consecutive recording were conducted completely and defective tracking error signals were observed only in several times and disorder of the observed signals were slight. As for CNR, in the range of $$0.6 \leq (d_3 \cdot n_3 + d_4 \cdot n_4 + d_5 \cdot n_5)/\lambda \leq 0.9, \text{ and}$$

$$1.2 \leq (d_3 \cdot n_3 + d_4 \cdot n_4 + d_5 \cdot n_5)/\lambda \leq 1.5,$$

excellent values of CNR of not less than 43 dB were obtained.

From Examples 23 and 24, it was found that the excellent consecutive recording characteristics were attained by virtue of the low thermal conductivity of the lower dielectric layer. Wherein, the low thermal conductivity was obtained by using silicon nitride containing hydrogen in an amount of 20 atom % or ZrO$_2$ containing SiO$_2$ in an amount of 20 mole % as a material of the lower dielectric layer.

In Examples 25 to 28, use was made of the upper dielectric layer having especially high thermal conductivity. In Examples 25 and 26, the recording powers were slightly higher than that of Example 18. In Examples 25, 26 and 28, no disordered signals were observed in the consecutive recording test. In Example 27, the consecutive recording test could be performed excellently, in spite that the thickness of the layers $(d_3+d_4+d_5)$ was thin (100 nm).

From the above, it was found that, by the two-layered structure of a dielectric layer, the heat diffused from a recording layer can be insulated and not conducted to the surface of a medium. It also found that, by the two-layered structure of a dielectric layer, the surface of a medium can be cooled enough and the recording power can be reduced resulting in the achievement of the stable consecutive recording.

INDUSTRIAL APPLICABILITY

In the present invention, a magneto-optical recording medium has a structure of a plurality of layers comprising at least a reflection layer, a recording layer and a dielectric layer laminated on a substrate in the above order, wherein the thickness of the dielectric layer is not less than 140 nm. Therefore, using the recording medium of the present invention, the stable consecutive recording can be achieved without the tracking error occurred by the disordered tracking error signal or the adhesion of dust particles onto the surface of the SIL head while the laser beam was irradiated in the near-field magneto-optical recording.

Besides, the recording medium of the present invention is characterized in a plurality of layers comprising at least a reflection layer, a recording layer, a lower dielectric layer, an upper dielectric layer, and a solid lubricating layer laminated on a substrate in the above order, wherein the thermal conductivity of the upper dielectric layer is higher than that of the lower dielectric layer, and the total thickness of the lower dielectric layer, the upper dielectric layer and the solid lubricating layer is not less than 90 nm. Therefore, by virtue of the lower dielectric layer, the heat diffused from the recording layer can not be conducted to the surface of the medium resulting that the temperature of the surface of the media can be maintained in low during recording and the recording power can be reduced. Further, by virtue of the upper dielectric layer, the surface of the medium are cooled resulting in the inhibition of the scattering of dust particles occurred by the absorption of the laser beam. Therefore, the stable consecutive recording can be achieved on the recording medium of the present invention.

Moreover, in the recording medium of the present invention, excellent SNR and resolution can be achieved by virtue of a surface roughness (Ra) of not more than 1.5 nm and a specific thickness of the dielectric layer. Further, by adjusting the thermal conductivity, the thickness and the structure of the noble alloy reflection layer to the specific range, a magneto-optical recording medium suitable for narrow track pitch and having high recording sensitivity can be obtained.

What is claimed is:

1. A magneto-optical recording medium characterized in a plurality of layers comprising at least a reflection layer, a recording layer, a lower dielectric layer, an upper dielectric layer, and a solid lubricating layer laminated on a substrate in the above order, wherein the thermal conductivity of said upper dielectric layer is higher than that of said lower dielectric layer, and the total thickness of said lower dielectric layer, said upper dielectric layer and said solid lubricating layer is not less than 90 nm and not more than 2,000 nm.

2. The magneto-optical recording medium according to claim 1, in which the thermal conductivity of said upper dielectric layer is not less than twice as much as that of said lower dielectric layer.

3. The magneto-optical recording medium according to claim 1, in which the thermal conductivity of said lower dielectric layer 20 is not more than $2 \times 10^5$ erg/(K.cm.s).

4. The magneto-optical recording medium according to claim 1, in which the thermal conductivity of said upper dielectric layer is not less than $3 \times 10^5$ erg/(K.cm.s).

5. The magneto-optical recording medium according to claim 1, in which the thermal conductivity of said lower dielectric layer is not more than $2 \times 10^5$ erg/(K.cm.s) and the thermal conductivity of said upper dielectric layer is not less than $3 \times 10^5$ erg/(K.cm.s).

6. The magneto-optical recording medium according to claim 1, in which both of the refractive indexes of said lower dielectric layer (refractive index; $n_{43}$, thickness; $d_{43}$) and said upper dielectric layer (refractive index; $n_{44}$, thickness; $d_{44}$) are not less than 1.7, and in which the refractive indexes and the thickness of these layers and the refractive index ($n_{45}$) and the thickness ($d_{45}$) of said solid lubricating layer satisfy a relationship represented by $$1 \text{ nm} \leq d_{45} \leq 50 \text{ nm, and}$$

$$0.6 \leq (d_{43} \cdot n_{43} + d_{44} \cdot n_{44} + d_{45} \cdot n_{45})/\lambda \leq 0.9 \text{ or}$$

$$1.2 \leq (d_{43} \cdot n_{43} + d_{44} \cdot n_{44} + d_{45} \cdot n_{45})/\lambda \leq 1.5,$$

wherein $\lambda$ represents a wavelength of a reproducing laser.

7. The magneto-optical recording medium according to claim 1, in which said lower dielectric layer is composed of ZnS containing $SiO_2$ in an amount of not less than 10 mole % and not more than 30 mole %.

8. The magneto-optical recording medium according to claim 1, in which said lower dielectric layer is composed of silicon nitride containing hydrogen in an amount of not less than 10 atom % and not more than 30 atom % or germanium nitride containing hydrogen in an amount of not less than 10 atom % and not more than 30 atom %.

9. The magneto-optical recording medium according to claim 1, in which said lower dielectric layer is composed of $ZrO_2$ containing $SiO_2$ in an amount of not less than 10 mole % and not more than 30 mole %.

10. The magneto-optical recording medium according to claim 1, in which said upper dielectric layer is composed of at least one material selected from the group of diamond, boron nitride, beryllium oxide, aluminium nitride, silicon carbide, silicon nitride, and germanium nitride.

* * * * *